US005247843A

United States Patent [19]

Bryan

[11] Patent Number: 5,247,843

[45] Date of Patent: Sep. 28, 1993

[54] APPARATUS AND METHODS FOR SIMULATING ELECTROMAGNETIC ENVIRONMENTS

[75] Inventor: Richard H. Bryan, Atlanta, Ga.

[73] Assignee: Scientific-Atlanta, Inc., Atlanta, Ga.

[21] Appl. No.: 584,999

[22] Filed: Sep. 19, 1990

[51] Int. Cl.[5] .................... G01S 13/88; G01M 19/00; H01Q 3/00; H01Q 3/02

[52] U.S. Cl. .................... 73/865.6; 73/167; 250/492.1; 342/170

[58] Field of Search .................... 73/167, 865.6, 865.9, 73/866.4; 250/492.1; 343/703, 720, 705, 894, 904; 342/62, 165, 167, 169, 170, 171, 172, 173, 174

[56] References Cited

U.S. PATENT DOCUMENTS

| | | | |
|---|---|---|---|
| 3,084,454 | 4/1963 | Schueller | 73/865.6 X |
| 3,114,910 | 12/1963 | Rymes | 343/703 X |
| 3,254,340 | 5/1966 | Sealander | 343/17.7 |
| 3,296,432 | 1/1967 | Le Vantine | 73/865.6 X |
| 3,302,205 | 1/1967 | Johnson | 343/703 |
| 3,388,604 | 6/1968 | McFarland et al. | 342/165 |
| 3,641,577 | 2/1972 | Tocquec | 343/754 |
| 4,106,345 | 8/1978 | Saunders et al. | 73/865.6 |
| 4,218,683 | 8/1980 | Hemming | 343/703 |
| 4,415,901 | 11/1983 | Gans | 343/754 |
| 4,536,766 | 8/1985 | Frazita | 342/372 |
| 4,823,134 | 4/1989 | James et al. | 342/422 X |
| 4,885,593 | 12/1989 | Hess, Jr. et al. | 343/786 |
| 4,901,080 | 2/1990 | McHenry | 342/1 |
| 5,111,689 | 5/1992 | Towry | 73/167 |
| 5,131,602 | 7/1992 | Linick | 342/62 X |

FOREIGN PATENT DOCUMENTS

| | | |
|---|---|---|
| 333166 | 9/1989 | European Pat. Off. . |
| 2602614 | 2/1988 | France . |
| 2603741 | 3/1988 | France . |
| 7549 | 8/1989 | PCT Int'l Appl. . |
| 987537 | 1/1983 | U.S.S.R. . |
| 2149624 | 6/1985 | United Kingdom . |

OTHER PUBLICATIONS

*International Patent Classification*, 5th Edition (1989) Section H, vol. 8, Electricity; World Intellectual Property Organization, Aerials, portion of p. 60.

Material entitled "Guided Weapons Radar Testing (Hardware-in-the -Loop Systems)" (undated), but by Nov. 1991 by Scientific Atlanta, 13 pages.

Manual (undated) but by Sep. 1990 "Systems Simulation and Development Directorate" used by the U.S. Army Missile Command at the Research, Development, and Engineering Center; pp. 1-98.

R. C. Johnson, H. A. Ecker, and J. H. Hollis, "Determination of Far-Field Antenna Patterns from Near-Field Measurements," vol. 61 Proceedings of the Institute of Electrical and Electronics Engineers, pp. 1668-1694 (No. 12, Dec. 1973).

R. E. Collin's, Foundations for Microwave Engineering, pp. 64-143 (1966).

D. Fink and D. Christiansen, ed., Electronics Engineers Handbook, pp. 18-23 to 18-35, (1982).

*Primary Examiner*—Tom Noland

*Attorney, Agent, or Firm*—Kilpatrick & Cody

[57] ABSTRACT

Systems and methods for simulating electromagnetic environments to be encountered by a moving object such as a missile are disclosed. The systems include compact ranges in "hardware in the loop" ("HIL") simulations as projection systems to provide cost- and space-efficient apparatus and processes for testing the performance of missiles and other objects. The systems disclosed may include mobile or stationary compact ranges and may use lenses or reflectors in connection with an array of one or more feed horns to convert spherical or "near field" wavefronts to plane waves within designated "quiet zones." If mobile ranges are employed, such ranges may be mounted on the flight tables used for repositioning the missile seekers during the simulations. Also disclosed are apparatus and processes for varying the amplitude and phase characteristics of the energy provided to an array of two or more feed horns in order to vary the apparent angle of received electromagnetic energy at electronic speeds. Typically, the number of feed horns used in varying the apparent angle of arrival is small (e.g., three). However, the small group may be part of a larger array in which switching is used to select one or more groups.

18 Claims, 5 Drawing Sheets

COMPACT RANGE PLUS INSTRUMENTATION

HIGH LEVEL BLOCK DIAGRAM OF AN HIL SYSTEM

REFLECTOR COMPACT RANGE ON POSITIONER SIDE VIEW

APPARATUS AND METHODS FOR SIMULATING ELECTROMAGNETIC ENVIRONMENTS

This invention relates to apparatus and methods for using compact ranges to simulate electromagnetic environments for computer-driven test systems utilizing but not expending performance hardware (i.e. "hardware in the loop," or "HIL," systems).

BACKGROUND OF THE INVENTION

Development and testing of projectiles and vehicles such as anti-aircraft and other missiles is often a lengthy and expensive process. As technological innovations cause onboard surveillance, guidance, and detonation equipment to become increasingly sophisticated, per unit costs and development periods of missiles typically increase. The increased sophistication and cost also frequently expand the mission profiles of the missiles, adding to the number and types of flight scenarios necessarily deemed to be within their performance characteristics. Similarly, advances in both active and passive electronic countermeasures ("ECM") and speed and maneuverability of targets multiply the performance environments for which the missiles must be designed.

Firing a missile at a target ("a live firing") and evaluating telemetry data from the missile (and perhaps from the target as well) present one means by which missile performance characteristics may be tested. As is widely known, however, such live firings are comparatively expensive, requiring extensive pre-flight planning and expending both a missile and a target (if the mission is successful) for each firing. Moreover, only one of many flight scenarios can be tested for each missile firing. Consequently, computer simulations usually are developed in order to generate the bulk of the missile performance information. These simulations rely on mathematical models of, for example, the guidance and surveillance operations of each missile and its associated radars, the known radiation and flight performance characteristics of each missile and target, ECM environments, and atmospheric conditions to emulate live firings. Because models may be developed for virtually every flight scenario for which the missile must be designed and neither actual missiles nor targets are expended, computer simulations provide means by which relatively cost-efficient performance data may be derived.

Although computer simulations in many cases provide reliable information concerning missile characteristics, modelling errors and assumptions concerning critical missile parameters may decrease the overall accuracy or verifiability of the results obtained. To counter this problem, alternative simulations have been developed in which the guidance and surveillance systems of actual missiles have been included in the systems. These systems, called "HIL" simulations, replace the mathematical model of the performance hardware (e.g. the missile being evaluated) with the hardware itself. Thus, even though the missile is not "fired," or expended in any way, data concerning missile performance may be obtained using an actual sample of the missile under test.

HIL systems are an economical means of obtaining initial vehicle performance characterizations, optimizing range testing to obtain comprehensive and detailed data, obtaining vehicle preflight nominal performance parameters, and obtaining a more complete understanding of range test results through post-test simulations of actual range conditions. HIL systems also supplement range testing by simulating conditions such as vehicle and target flight envelopes, target emitter characteristics and electromagnetic environments that may not be available in actual range testing. Since the simulations are performed in a secure, shielded facility, the flight scenario and performance data are more secure, unlike test ranges where optical and electronic reconnaissance may be a concern. Additionally, comprehensive sets of flight scenarios, involving hundreds of simulations, may be performed in the same period of time and for the same cost as one or two live tests.

FIG. 1 illustrates a block diagram of a typical HIL system for evaluating the appropriate guidance and surveillance equipment of a missile. Other HIL systems are described in an undated brochure of the U.S. Army Missile Command, Redstone Arsenal, Alabama, entitled "Research, Development, and Engineering Center/-Systems Simulation and Development Directorate/Advanced Simulation Center," which brochure is incorporated herein in its entirety by this reference. In addition to missile under test 14, HIL system 10 includes computers 18 and 22 for controlling flight motion and target parameters, respectively, mechanical means 26 for repositioning missile 14 at various intervals, and a signal projection system 30. Digital and analog links 34, 38, 42, 46, and 50 permit communication between computers 18 and 22 and the other system components. Typically, signal projection system 30 comprises a large, wall-mounted antenna array allowing signal propagation into a shielded anechoic chamber 54 on the order of twenty-five hundred square feet. Not only is the typical signal projection system 30 expensive, but its size and shielding requirements make it impractical for placement in the vast majority of existing buildings. The complex radio-frequency switching hardware and software necessary to energize the many feeds in the array of such a conventional HIL system in order to provide adequate target and environment simulation adds further expense, complexity and maintenance requirements.

SUMMARY OF THE INVENTION

The present invention addresses these disadvantages by including a compact range in a modified HIL system as a means for projecting signals at missile 14 or components of the missile such as the seeker. For purposes of this document, the term "missile" means any object, whether a missile, an airplane, or other vehicle, or portion of such object, that includes a receiving antenna and that is suitable for exposure to radiation in an HIL system. The term "missile seeker" or "seeker" means all or portions of the guidance system of the missile that are being tested, (including or excluding surveillance and other associated systems and some or all of the antenna or antennas, of the guidance system).

Compact ranges are discussed in U.S. Pat. No. 3,302,205, issued Jan. 31, 1967 to R. C. Johnson, which patent is incorporated herein in its entirety by this reference. Briefly, however, one type of such range provides plane waves by reflecting spherical waves generated by a radio frequency ("RF") feed positioned at the focal point of an associated parabolic reflector off the reflector's paraboloidal surface. Another type of range performs the conversion to planar wavefronts using a lens of suitable refractive material. Even though the waves are emitted at only comparatively short ("near field") distances from the antenna or other object under test, in a properly defined "quiet zone" the plane waves created are relatively uniform and undistorted, and thus very effectively and efficiently simulate far-field conditions. Use of a compact range in connection with the present invention, therefore, reduces the chamber space required for the HIL system and decreases both the cost and complexity of the overall system. The present invention also permits an increased field of view of the seeker of missile 14 over the wall array approach even when using a "synthetic" line of sight (i.e. where the missile seeker is moved so as to remain aligned with the range), reduces the cost associated with adding frequency coverage and operating in either infrared radiation ("IR") or RF modes, and provides better power coupling efficiency.

The present invention accordingly contemplates use of either a lens or reflector-type (or any other type of refraction or reflection) compact range as a projection system in an HIL system. Although lenses typically weigh more than reflectors of equivalent size, for larger quiet zones, the total inertia for lens systems is considerably less than that of reflector systems since the lens may be positioned much closer to the axis of rotation of the system than the reflector.

The present invention may employ various embodiments to project, or present a missile with, a simulated electromagnetic environment, which may include targets, clutter, and ECM, and in varying the apparent angles of arrival of such signals. (The term "apparent angle of arrival" or "apparent angle," for purposes of this document, means the direction from which the missile seeker interprets a particular signal as having arrived.) The use of a compact range in an HIL system according to the present invention to vary the apparent angle of signals may manifest itself in many different structures and processes. For instance, the projection systems may vary the apparent angle (1) by physically moving the compact range reflector or lens about at least one axis of the range, (2) by moving the feeds, (3) by moving both the reflector or lens and the feeds, or (4) by moving neither (Stationary Approach). In all such cases, such projection systems may be adapted to employ electronic beam deflection (varying phase and/or amplitude) of radiated signals, and/or switching of signals to desired feeds, as a means or additional means to vary the apparent angle of signals. Any number of feeds may be used as desired, including small arrays of preferably three feeds, or larger arrays of more feeds.

It is therefore an object of the present system to provide an HIL simulation utilizing a compact range as a signal projection mechanism.

It is an additional object of the present system to provide a smaller and less complex and costly HIL simulation than typical chamber-sized systems using large wall-mounted antenna arrays.

It is another object of the present system to provide an HIL simulation which provides relative motion by moving either or both of the compact range and the object under test.

It is yet another object of the present system to provide an HIL simulation which may use either a lens or a reflector in connection with a feed horn array.

Other objects, features, and advantages of the present invention will become apparent with reference to the remainder of the text and the drawings of the application.

DETAILED DESCRIPTION

Figure 1:
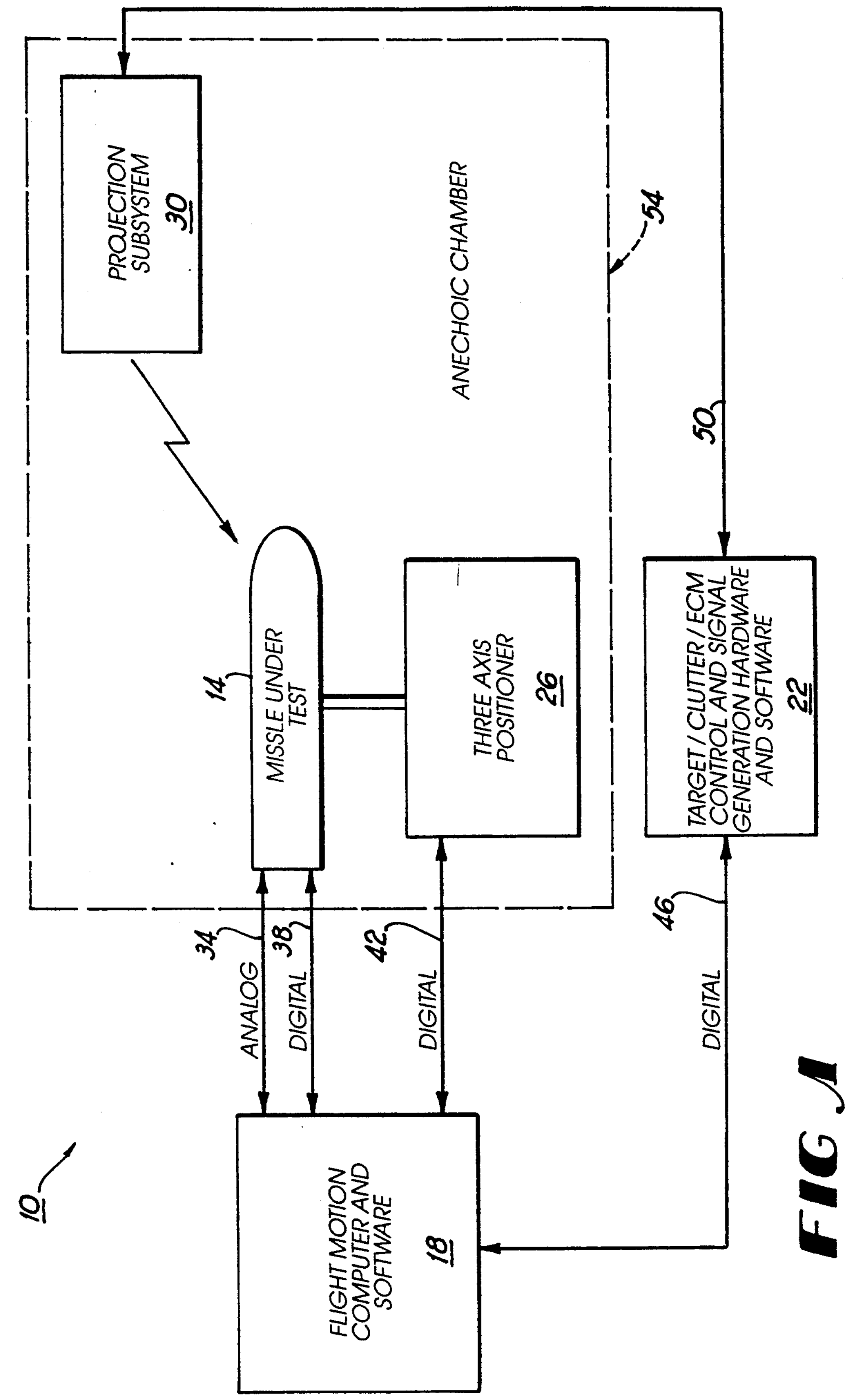
FIG. 1, as noted earlier, is a block diagram of a typical HIL system.

FIG. 1 illustrates in block diagram form a typical HIL system 10. HIL system 10, as discussed in connection with the Background of the Invention, includes all or part of a projectile or other test object such as missile under test 14, one or more computers 18 and 22 for simulating and controlling such items as flight motion of the missile 14 and its target, the flight environment (including, for example, clutter and ECM), and signal generation, and a mechanical means 26 such as a three-axis positioner for positioning missile 14 based on commands received from flight motion computer 18. HIL system 10 also comprises a projection system 30, which typically is a wall-mounted antenna array for transmitting signals to missile 14, and generally is housed in a large anechoic chamber 54. Analog and digital communication channels 34, 38, 42, 46, and 50 link computers 18 and 22 with the other system components.

Figure 2:
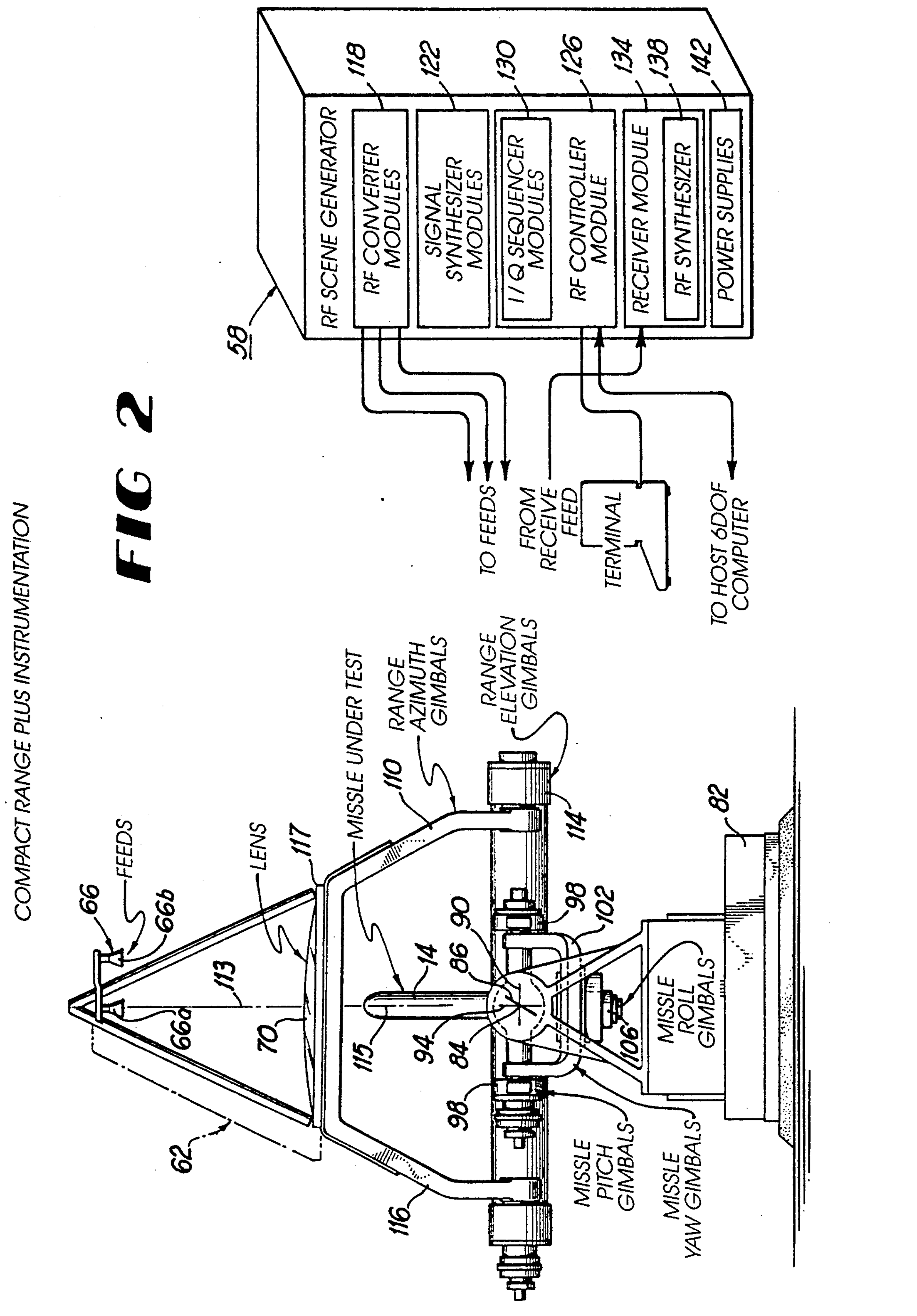
FIG. 2 is a schematic representation of the instrumentation of the present invention shown opposite a side elevational view of a mobile, lens-type compact range.

FIG. 2 is a schematic representation of instrumentation 58 of the present invention shown opposite a side elevational view of a mobile, lens-type compact range 62. Range 62 includes antenna feeds 66 and lens 70 and may be mounted on flight table 82. As illustrated in FIG. 2, flight table 82 permits movement of missile 14 about three axes relative to a preselected point 84 (which may correspond, e.g., to the center of the seeker or missile 14 center of gravity). Included among these three axes are missile pitch, yaw, and roll axes 86, 90, and 94, respectively, with missile pitch gimbal 98, yaw gimbal 102, and roll gimbal 106 functioning to provide appropriate motion. Flight table 82 is conventionally modified with additional gimbals and structure to permit two additional degrees of freedom, corresponding to elevation and azimuth of range 62, relative to axes 86 and 90 intersecting at preselected point 84. Range azimuth gimbal 110, for example, which includes spars 116 for supporting the feeds 66 and a plate 117 for the lens 70, may be used to alter the azimuthal position of range 62 with respect to preselected point 84, while generally ring-shaped elevation gimbal 114 permits variation of the elevation of range 62 vis-a-vis preselected point 84. Flight table 82, which may be obtained from and modified by any supplier of flight tables conventionally used in conventional hardware in the loop systems, thereby functions to produce appropriate intercept geometries by providing five degrees of freedom in which missile 14 and range 62 may move relative to preselected point 84. This configuration thus varies the relative or apparent angle of incident energy encountered by the missile 14 (the angle between the axis 115 of missile 14 and a ray perpendicular to the energy planar wavefronts by moving feeds 66 and lens 70 physically with respect to missile 14, and by moving missile 14 itself.

In one embodiment of the present invention consistent with FIG. 2, three antenna feeds 66 (only two of which, 66*a* and 66*b*, are shown) emit radiation which passes through lens 70. (The third feed 66 is preferably positioned on an axis oriented ninety degrees from the feed 66*a*—feed 66*b* axis, and at a substantially equal distance from feed 66*a* as is feed 66*b*. The feeds may positioned according to any other desired pattern.) Radiation emitted from feed 66*a*, if aligned with the focal axis 113 of lens 70 as shown, may be refracted so as to produce a plane wave in the quiet zone of the lens 70, which zone may have a diameter of between approximately fifty to seventy percent of the diameter of lens 70. The other two feeds (66*b* and the feed not shown) are then displaced from the focal axis 113 of lens 70 in azimuth and elevation, respectively, allowing plane waves to arrive at missile 14 from different directions. The amount of displacement may be adjusted depending on the results sought to be achieved and normally will need to be varied as a function of the beamwidth of the missile 14 seeker. For a missile 14 seeker having a three decibel beamwidth of fourteen degrees, for example, the feeds 66 may be separated by approximately seven inches to produce approach angles of approximately ten degrees from the lens focal axis 113.

Those having ordinary skill in the art will recognize that various dimensions, quantities, and distances of or between components may be used in connection with the present invention. In some embodiments lens 70 has a diameter of forty inches. Such a lens 70 produces a quiet zone of diameter approximately twenty to twenty-eight inches, depending on how the zone is defined. If parameters involving missile seeker and radome size, axis and angle of rotation, and boresight shift error requirements necessitate a quiet zone of different size, however, the diameter of lens 70 may be altered as appropriate to produce acceptable results. Lens 70 may be formed of plastic or other desirable material that has appropriate strength, machinability, density and refraction properties.

Instrumentation 58 for the system of the present invention is denoted as the "RF SCENE GENERATOR" in FIG. 2. Instrumentation 58 includes RF converter modules 118, signal synthesizer modules 122, an RF controller module 126 containing sequencer modules 130, a receiver module 134 having an RF synthesizer 138, and power supplies 142. RF converter modules 118 may be linked to feeds 66, while receiver module 134 receives input from the seeker of missile 14. RF controller module 126 additionally may communicate with one or more terminals or user interfaces and a host computer, which corresponds to computer 18 of FIG. 1.

Instrumentation 58 simulates RF environments encountered by missile 14 during flight by generating, transmitting, and receiving complex electromagnetic waveforms. Multiple target (point source or extended in range and cross-range), clutter, decoy, and ECM signatures may be created using instrumentation 58, for example, for emission through feeds 66. The instrumentation 58 also may be operated in either "closed loop" or "stand alone" mode, the former of which permits operation in response to both a programmed scenario and the seeker of missile 14 under test while the latter is designed primarily as a simulator system testing facility. In closed loop mode, instrumentation 58 receives signals Via receiver module 134 directly or indirectly from the seeker of missile 14, processes the signals to recover non-stationary parameters, generates the carrier frequency and complex modulations necessary to mimic radar returns from targets and clutter, and transmits the generated signals with appropriate delays and phase and amplitude characteristics and doppler shifts via RF converter modules 118 to feeds 66. If the missile motions and the electromagnetic environment are modelled correctly, simulation results should closely correspond with those obtained from live firings.

Figure 3:
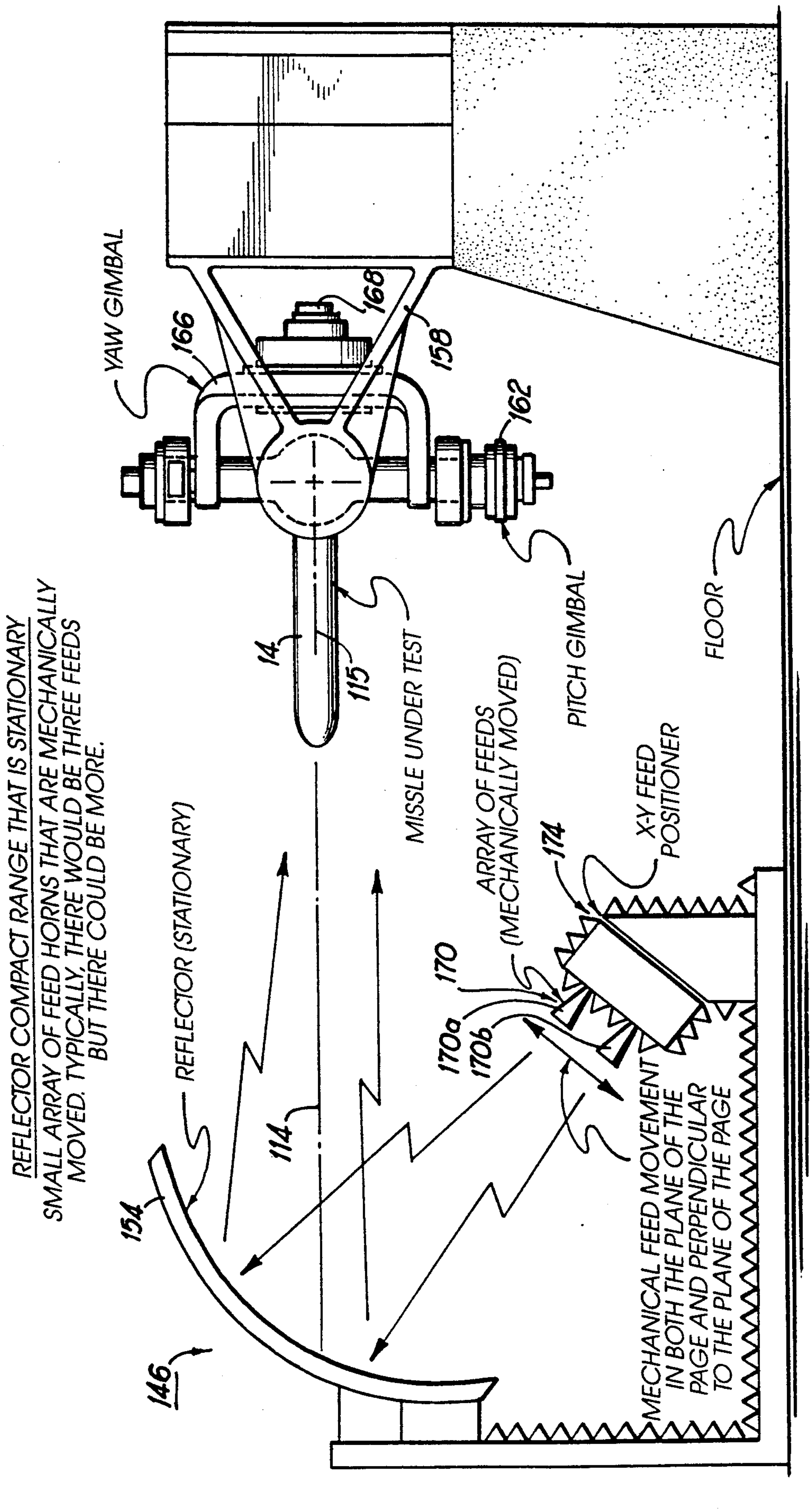
FIG. 3 is a side elevational view of a stationary, reflector-type compact range of the present invention illustrating a mechanically moveable array of feed horns.
Figure 4:
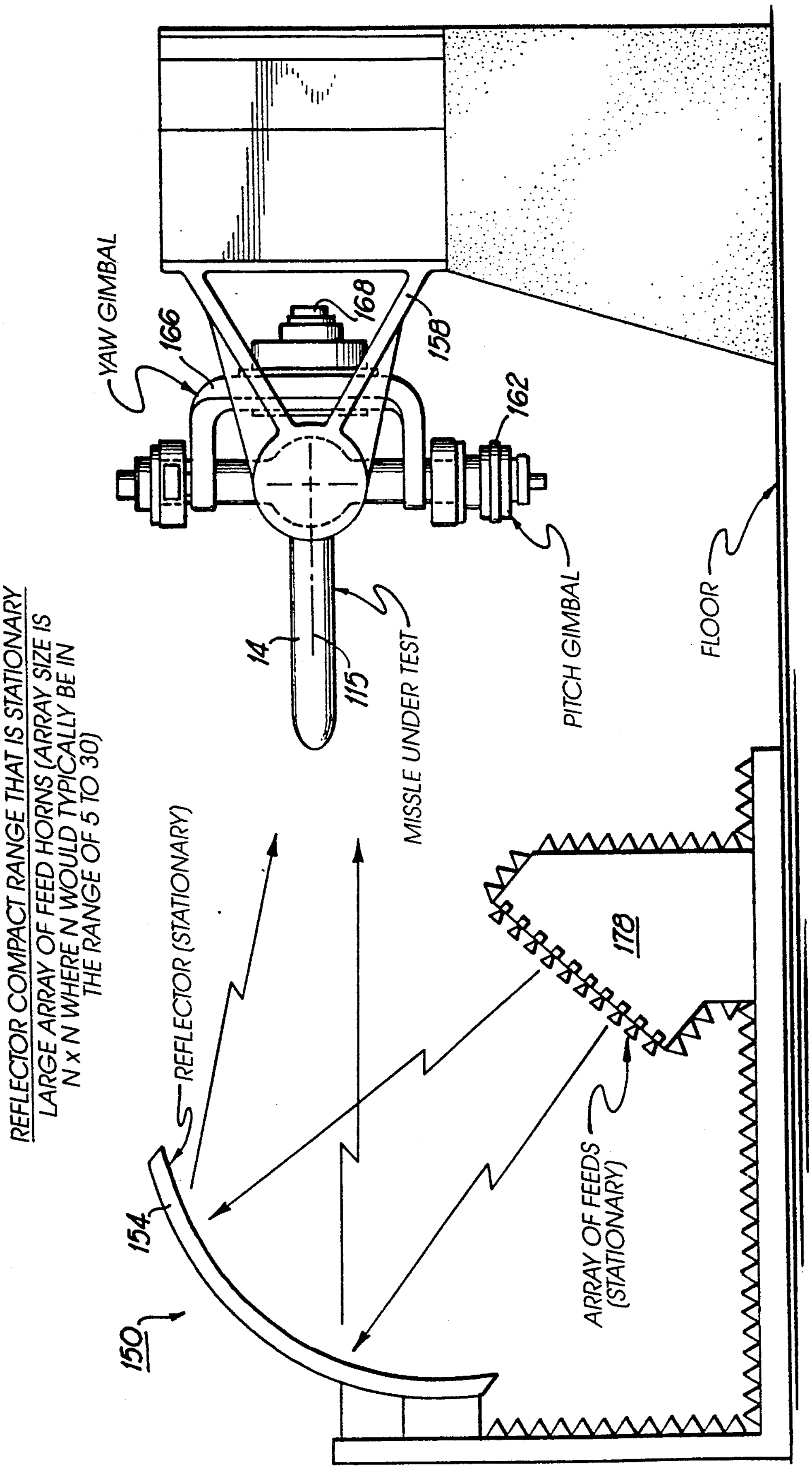
FIG. 4 is a side elevational view of an alternative stationary, reflector-type compact range of the present invention illustrating a stationary feed horn array.

FIGS. 3 and 4 provide side elevational views of reflector-type compact ranges 146 and 150, respectively, which may be used in connection with the present invention. Ranges 146 and 150 are considered to be "stationary" ranges because reflector 154 is fixed in position. Missile 14 motion is created in ranges 146 and 150 by utilizing a three-axis positioner 158 to provide pitch, roll, and yaw movements for missile 14, and FIGS. 3 and 4 illustrate the pitch 162, yaw 166, and roll 168 gimbals for missile 14. FIG. 3 also details an array of feed horns 170 and a two-axis positioner 174 for permitting movement of the feeds 170 relative to the focal point of reflector 154; the feeds 170 are physically positioned, but the reflector 154 remains stationary, in this configuration, to produce the apparent angle of received energy 117.

FIG. 4 shows an N×N feed horn array 178 (where N is an integer between approximately five and thirty) whose position remains stationary with respect to reflector 154. Either of feed horn arrays 170 or 178, however, allows use of both "real" (i.e. missile seeker 14 moves relative to compact range 146 or 150) and "synthetic" (i.e. positioner 148 moves missile seeker 14 so that it remains aligned with range 146 or 150) lines of sight. In this configuration, neither array 178 of feeds nor the reflector 154 is physically positioned to vary the apparent angle 117; instead, the signal is switched, or changed, as desired, from one or more feeds to other feeds in the array 178.

Figure 5:
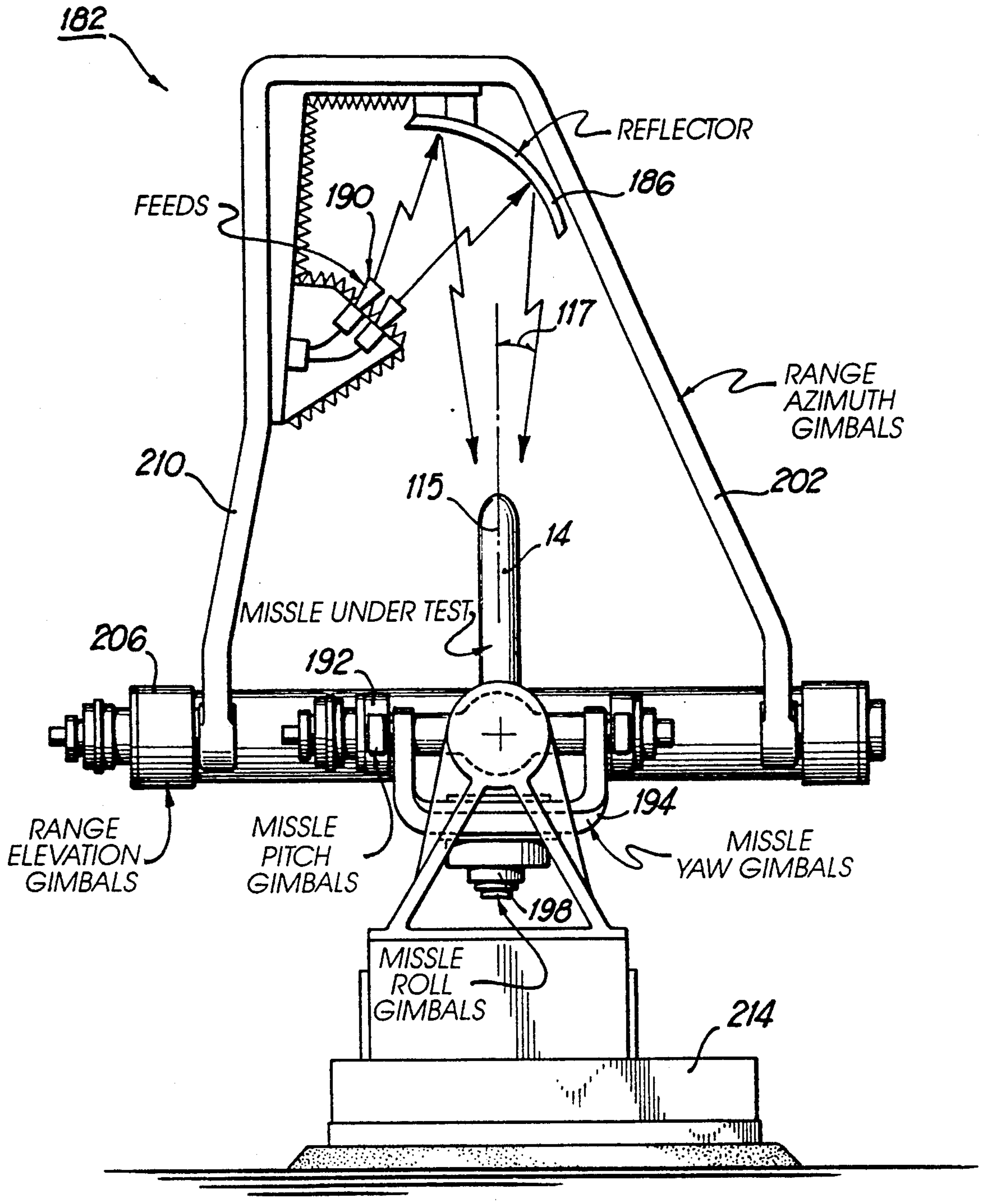
FIG. 5 side elevational view of a mobile, reflector-type compact range of the present invention.

FIG. 5 details another reflector-type range 182 conceptually similar to the mobile range 62 of FIG. 2. Range 182 includes a reflector 186 rather than lens 70, however, and as shown in FIG. 5, positions both the feeds 190 and the reflector 186 to vary the apparent angle of received energy 117. Also illustrated in FIG. 5 are missile 14, missile pitch, yaw, and roll gimbals 192, 194, and 198, respectively, range azimuth gimbal 202, range elevation gimbal 206, spars 210, and flight table 214.

One embodiment of the present invention consistent with FIG. 5 includes three feeds 190 and a reflector 186 projecting a circular aperture approximately forty-six centimeters in diameter and having a focal length of approximately fifty-one centimeters. This embodiment is designed to create a quiet zone of at least nine to ten inches in diameter. Feeds 190 are circular scalar waveguide horns having an aperture diameter of approximately one wavelength of the RF radiation emitted. One feed (the central feed) is positioned so as to create a wavefront that leaves the reflector 186 parallel to its focal axis. The other two feeds (one is not visible in FIG. 5) will be physically displaced from the central feed so as to create wavefronts leaving the reflector 186 at non-zero angles to the focal axis. Because the positions of feeds 190 may be adjusted, feeds 190 may be positioned to align each of the three plane waves with each of the peak of the sum channel antenna pattern and the first sum pattern null in the elevation and azimuthal planes, providing means by which signals can be independently created for the sum and difference channels for the seeker of missile 14 under test.

In addition to varying apparent angles of received energy by positioning feeds or refractors or reflectors or both, the present invention also incorporates programs that vary the amplitude and phase of signals provided to the feeds in order to vary the apparent angle. Such conditioning is necessary in the stationary range (such as that shown in FIG. 4) which uses the small array of feeds acting in conjunction with a reflector, but it is also useful in the movable feed and movable feed/refractor or reflector system. Such conditioning is necessary to simulate electromagnetic environments that feature more than one signal source, such as environments with multiple targets, clutter, and/or ECM. It is also necessary to simulate changes of direction at electronic speeds (rather than mechanical speeds), to simulate phenomena such as angular glint from targets, and to compensate for mechanical errors such as those caused by high dynamics in moving components of the compact range.

Table 1 below details general specifications of a hardware-in-the-loop system that would use one embodiment of the present invention. The table and the other text and drawings of this application are provided for purposes of illustrating, explaining, and describing embodiments of the present invention. Modifications and adaptations to these embodiments will be apparent to those of ordinary skill in the art and may be made without departing from the scope or spirit of the invention. In particular, a variety of lenses, reflectors, feeds, and positioners may be used in connection with the present system. Incorporated herein in their entireties by this reference are R. C. Johnson, H. A. Ecker, and J. H. Hollis, "Determination of Far-Field Antenna Patterns From Near-Field Measurements," *Proceedings of the IEEE* at 1668-94 (vol. 61, no. 12, Dec. 1973), Chapter 3 of R. E. Collin, "Foundations for Microwave Engineering" (1966), pages 18-23 to −35 of the "Electronics Engineers' Handbook" (2d ed. 1982), and U.S. Pat. No. 4,885,593, issued Dec. 5, 1989 to Hess, Jr., et al., each of which discusses material relevant to alternative designs of the present invention.

TABLE 1

| Parameter | Value |
|---|---|
| Priorities (Seeker) | Active<br>(1) Air-to-Ground (against fixed and moving targets)<br>(2) Air-to-Sea (against ships)<br>(3) Ground-to-Air<br>(4) Air-to-Air<br>Semi-active<br>(1) Air-to-Ground (against fixed and moving targets)<br>(2) Air-to-Sea (against ships)<br>(3) Ground-to-Air<br>(4) Air-to-Air<br>Passive<br>(1) Anti-radiation missile (ARM)<br>(2) Air-to-Ground (against fixed and moving targets)<br>(3) Air-to-Sea (against ships)<br>(4) Air-to-Air |
| Signal Types | FM/CW and FM/ICW: the seeker uses a highly linear (depending upon sensor linearization accuracy) FM modulation with unidirectional (up or down) |

TABLE 1-continued

| Parameter | Value |
|---|---|
| | frequency slopes and a frequency reset to the beginning of the frequency template after reaching band edge. Pulsed millimeter wave active sensors, ARM, active ECM and semi-active sensors, ability to handle active non-coherent and coherent pulsed sensors with repetitive cycle frequency agility. When the seeker operates in the pulsed mode, it may operate in either the fixed frequency or the frequency agile modes (interpulse) phase and FM codes are not part of the current waveform set). Frequency agility may use the full operating band of 600 MHz and have step sizes greater than ¼ of the per pulse instantaneous bandwidth and up to the full operating RF bandwidth. Both linear and random frequency agile sequences are permitted. |
| Frequency Range | 1 to 100 GHz |
| Signal Bandwidth | 600 MHz |
| Peak Target RCS | 1000 square meters (when all reflectors of the "stick" model add coherently) |
| Seeker Aperture Size | 25 to 200 millimeter diameter |
| Clutter Backscatter Coefficients | Peak mean backscatter coefficient ranges upward to 0 dBm/m$^2$, its distribution is log normal and standard deviations up to 5 dB. Three sigma excursions are simulated without limiting. |
| Slant Ranges | 25 to 5000 meters |
| Sensor PRF | Pulsed/ICW, 1.0 kHz to 1.0 MHz |
| Seeker Peak Transmit Power | 100 watts: pulsed<br>10 watts: FM/CW or FM/ICW |
| Sensor Pulse Length | Pulsed Mode: 10 to 200 nanoseconds<br>ICW Mode: compatible with the sensor PRF so as to maintain a transmit duty factor in the 20 to 50 percent range |
| RF Polarization | Simultaneous dual linear or circular polarizations. Polarization isolation as measured at the feeds should be at least 30 dB. |
| LOS Simulation Accuracy | Better than 0.2 milliradians, 1 sigma |
| Sensor Scan Characteristics | When simulating target track, the LOS average rates of up to 15 degrees/sec with accelerations of up to 50 degrees/sec$^2$ (not including, for example, glint type perturbations introduced by the complex target). Higher instantaneous rates and accelerations as consistent with temporal, platform motion and frequency modulation induced apparent LOS motions are simulated via the complex target simulator. |
| End Game Simulation | In terminal track situations when the physical target begins to fill (or exceed) the physical angular limits of the sensor aperture. To simulate these effects, coupled scatterers (in accordance with predefined target "stick" models) are assumed. This effect applies to physical shapes characteristics of tanks and trucks to simulate slant ranges as short as 25 meters.<br>The simulator may have the capacity to simulate up to 32 individual scattering centers that can be used to specify single and/or multiple targets within the instantaneous field of view of the seeker. |
| Target Search Software | Target search simulation software:<br>(1) is compatible with air-to-ground track and target search<br>(2) handles the beam-to-ground pattern intercept<br>(3) has the potential of introducing statistical clutter responses which have appropriate cross range |

TABLE 1-continued

| Parameter | Value |
|---|---|
| | correlation properties and deterministic discontinuities in terrain backscatter coefficients |
| Special Features | Automatic Calibration System<br>Built-in-Test Capability<br>Receive Mode Capability |

What is claimed is:

1. A system for illuminating a missile (i.e., a rocket system or similar travelling projectile) under test with energy, the missile under test including at least one receiving antenna for providing output signals in response to the energy illuminating the missile under test, comprising:
   a. at least one source which comprises at least two feeds for radiating spherical wavefronts of energy;
   b. compact range means comprising a reflector for converting the spherical wavefronts into substantially planar wavefronts of energy for illuminating the missile under test; and
   c. means for varying the apparent angle of energy illuminating the missile under test as a function of the output signals comprising means selected from the group consisting of means for changing the phase and amplitude of energy radiated from the source, means, for switching the feeds from which the energy is radiated, and means for changing the phase and amplitude of energy radiated from the source and for switching the feeds from which the energy is radiated.

2. The system of claim 1 in which the means for varying the apparent angle of energy includes means for moving the compact range means about at least one axis of rotation.

3. The system of claim 1 in which the means for varying the apparent angle of energy includes means for moving the source of radiating the energy.

4. A system for illuminating a missile (i.e., a rocket system or similar travelling projectile) under test with energy, the missile under test including at least one receiving antenna for providing output signals in response to the energy illuminating the missile under test, comprising:
   a. at least one source which comprises at least two feeds for radiating spherical wavefronts of energy;
   b. compact range means comprising a lens for converting the spherical wavefronts into substantially planar wavefronts of energy for illuminating the missile under test; and
   c. means for varying the apparent angle of energy illuminating the missile under test as a function of the output signals comprising means selected from the group consisting of means for changing the phase and amplitude of energy radiated from the source, means for switching the feeds from which the energy is radiated, and means for changing the phase and amplitude of energy radiated from the source and for switching the feeds from which the energy is radiated.

5. The system of claim 4 in which the means for varying the apparent angle of energy includes means for moving the compact range means about at least one axis of rotation.

6. The system of claim 4 in which the means for varying the apparent angle of energy includes means for moving the source for radiating the energy.

7. A system for illuminating a missile (i.e., a rocket system or similar travelling projectile) under test with energy, the missile under test including at least one receiving antenna for providing output signals in response to the energy illuminating the missile under test, comprising:
   a. at least one source which comprises at least three feeds for radiating spherical wavefronts of energy;
   b. compact range means comprising a reflector for converting the spherical wavefronts into substantially planar wavefronts of energy for illuminating the missile under test; and
   c. means for varying the apparent angle of energy illuminating the missile under test as a function of the output signals.

8. A system for illuminating a missile (i.e., a rocket system or similar travelling projectile) under test with energy, the missile under test including at least one receiving antenna for providing output signals in response to the energy illuminating the missile under test, comprising:
   a. at least one source which comprises at least three feeds for radiating spherical wavefronts of energy;
   b. compact range means comprising a lens for converting the spherical wavefronts into substantially planar wavefronts of energy for illuminating the missile under test; and
   c. means for varying the apparent angle of energy illuminating the missile under test as a function of the output signals.

9. A system for illuminating a missile (i.e., a rocket system or similar travelling projectile) under test with energy, the missile under test including at least one receiving antenna for providing output signals in response to the energy illuminating the missile under test, comprising:
   a. at least one source which comprises at least two feeds for radiating spherical wavefronts of energy which, when converted into substantially planar wavefronts, correspond to electromagnetic environments of the missile under test in flight conditions;
   b. compact range means comprising a reflector for converting the spherical wavefronts into substantially planar wavefronts of energy for illuminating the missile under test; and
   c. means for varying the apparent angle of energy illuminating the missile under test as a function of the output signals comprising means selected from the group consisting of means for changing the phase and amplitude of energy radiated from the source, means for switching the feeds from which the energy is radiated, and means for changing the phase and amplitude of energy radiated from the source and for switching the feeds from which the energy is radiated.

10. The system of claim 9 in which the means for varying the apparent angle of energy includes means for moving the compact range means about at least one axis of rotation.

11. The system of claim 9 in which the means for varying the apparent angle of energy includes means for moving the source for radiating the energy.

12. A system for illuminating a missile (i.e., a rocket system or similar travelling projectile) under test with energy, the missile under test including at least one receiving antenna for providing output signals in response to the energy illuminating the missile under test, comprising:

a. at least one source which comprises at least two feeds for radiating spherical wavefronts of energy which, when converted into substantially planar wavefronts, correspond to electromagnetic environments of the missile under test in flight conditions;

b. compact range means comprising a lens for converting the spherical wavefronts into substantially planar wavefronts of energy for illuminating the missile under test; and c. means for varying the apparent angle of energy illuminating the missile under test as a function of the output signals comprising means selected from the group consisting of means for changing the phase and amplitude of energy radiated from the source, means for switching the feeds from which the energy is radiated, and means for changing the phase and amplitude of energy radiated from the source and for switching the feeds from which the energy is radiated.

13. The system of claim 12 in which the means for varying the apparent angle of energy includes means for moving the compact range means about at least one axis of rotation.

14. The system of claim 12 in which the means for varying the apparent angle of energy includes means for moving the source for radiating the energy.

15. A system for illuminating a missile (i.e., a rocket system or similar travelling projectile) under test with energy, the missile under test including at least one receiving antenna for providing output signals in response to the energy illuminating the missile under test, comprising:

a. at least one source which comprises at least two feeds for radiating spherical wavefronts of energy;

b. compact range means comprising a reflector for converting the spherical wavefronts into substantially planar wavefronts of energy for illuminating the missile under test; and c. means for moving the source relative to the missile under test as a function of the output signals, comprising means selected from the group consisting of means for changing the phase and amplitude of energy radiated from the source, means for switching the feeds from which the energy is radiated, and means for changing the phase and amplitude of energy radiated from the source and for switching the feeds from which the energy is radiated.

16. The system of claim 15 in which the means for moving the source relative to the missile under test includes means for moving the compact range means about at least one axis of rotation.

17. A system for illuminating a missile (i.e., a rocket system or similar travelling projectile) under test with energy, the missile under test including at least one receiving antenna for providing output signals in response to the energy illuminating the missile under test, comprising:

a. at least one source which comprises at least two feeds for radiating spherical wavefronts of energy;

b. compact range means comprising a lens for converting the spherical wavefronts into substantially planar wavefronts of energy for illuminating the missile under test; and c. means for moving the source relative to the missile under test as a function of the output signals, comprising means selected from the group consisting of means for changing the phase and amplitude of energy radiated from the source, means for switching the feeds from which the energy is radiated, and means for changing the phase and amplitude of energy radiated from the source and for switching the feeds from which the energy is radiated.

18. The system of claim 17 in which the means for moving the source relative to the missile under test includes means for moving the compact range means about at least one axis of rotation.

* * * * *

UNITED STATES PATENT AND TRADEMARK OFFICE
CERTIFICATE OF CORRECTION

PATENT NO. : 5,247,843

DATED : September 28, 1993

INVENTOR(S) : Richard H. Bryan

It is certified that error appears in the above-identified patent and that said Letters Patent is hereby corrected as shown below:

Column 4, line 68, after the word "wavefronts" insert --)--

Column 6, line 2, delete the word "Via" and insert --via-- therefor

Column 8, at approximately line 13, delete ")" after the word "interpulse"

Column 9, line 29, delete the comma after the word "means"

Signed and Sealed this

Second Day of August, 1994

Attest:

BRUCE LEHMAN

*Attesting Officer* *Commissioner of Patents and Trademarks*